(12) United States Patent
Nie et al.

(10) Patent No.: US 12,253,967 B2
(45) Date of Patent: Mar. 18, 2025

(54) APPLICATION VIRTUALIZATION IN AN EMULATOR USING AN AUTHENTICATION PROCESSOR

(71) Applicant: GM GLOBAL TECHNOLOGY OPERATIONS LLC, Detroit, MI (US)

(72) Inventors: Bo Nie, Unionville (CA); Amandeep Saini, Brampton (CA)

(73) Assignee: GM Global Technology Operations LLC, Detroit, MI (US)

( * ) Notice: Subject to any disclaimer, the term of this patent is extended or adjusted under 35 U.S.C. 154(b) by 48 days.

(21) Appl. No.: 18/340,011

(22) Filed: Jun. 22, 2023

(65) Prior Publication Data
US 2024/0427725 A1    Dec. 26, 2024

(51) Int. Cl.
*G06F 13/42* (2006.01)
*G06F 9/455* (2018.01)
*G06F 13/38* (2006.01)
*G06F 21/44* (2013.01)

(52) U.S. Cl.
CPC ...... *G06F 13/4282* (2013.01); *G06F 9/45558* (2013.01); *G06F 13/382* (2013.01); *G06F 21/44* (2013.01); *G06F 2009/45579* (2013.01); *G06F 2213/0042* (2013.01)

(58) Field of Classification Search
CPC .................................................. G06N 20/00
See application file for complete search history.

(56) References Cited

U.S. PATENT DOCUMENTS

| | | | | |
|---|---|---|---|---|
| 2011/0016494 | A1* | 1/2011 | Linhardt | H04N 21/41407 725/62 |
| 2015/0138089 | A1* | 5/2015 | Angerbauer | G06F 3/03547 345/157 |
| 2016/0062940 | A1* | 3/2016 | Cota-Robles | G06F 13/28 710/313 |

* cited by examiner

*Primary Examiner* — Henry Tsai
*Assistant Examiner* — Juanito C Borromeo
(74) *Attorney, Agent, or Firm* — Quinn IP Law

(57) ABSTRACT

Apparatuses and methods for enabling an MFi stack and corresponding MFi application to be authenticated in an emulator operating using one or more processors/CPUs are presented. In one aspect, a computer may include a memory and processor configured to execute the operating system. The computer may include a USB bus coupled through USB interface to a dongle. The dongle may include an authentication coprocessor for use in an integrated circuit (I2C)-to-USB configuration, and an I2C-to-USB computer. Driver code running on the computer may manage the data exchanged between the authentication coprocessor and a virtual emulator on the computer. The emulator may include a USB-to-I2C driver that virtualizes the authentication coprocessor as an I2C device running with the MFi application like CarPlay.

20 Claims, 3 Drawing Sheets

APPLICATION VIRTUALIZATION IN AN EMULATOR USING AN AUTHENTICATION PROCESSOR

INTRODUCTION

Numerous applications for exploiting the benefits of mobile devices, or smartphones, in the context of larger devices have been introduced in recent years. Examples of such larger devices include vehicles. In a typical scenario, vehicle manufacturers may develop Bluetooth-based applications to enable a driver of the vehicle to talk "hands free" in a manner that avoids undesired manual use of the driver's mobile device when driving the vehicle.

A challenge inherent in developing software for use in other applications is that different programs are often produced using disparate operating systems and protocols. A distributor, for example, may intend to sell an application to a variety of different vehicle manufacturers. A sizable percentage of those manufacturers, however, may utilize specific technologies and protocols in their vehicles that are not always compatible with the technology at issue. To overcome this obstacle, the provider of these technologies may distribute to the vehicle manufacturers additional authentication-based devices to enable the purchaser, such as a vehicle manufacturer, to authenticate the provider's technology in the purchasers' vehicles.

One such example is Apple™ CarPlay. CarPlay is a technology that may be used to project a consumer's iPhone screen to a vehicle infotainment display for use as part of the infotainment system. To enable non-Apple devices to connect with Apple devices such as CarPlay, Apple designed an authentication coprocessor to connect to the main processor(s) in an embedded system through an inter-integrated circuit ("I2C"). In this example, Apple provides the coprocessor design and requests that the manufacturer assemble it together within a system-on-a-chip (SOC). Accordingly, a vehicle infotainment system that supports CarPlay needs an authentication processor for authentication purposes. Only then may CarPlay be connected for use. This limiting scenario gives rise to a problem when customizing CarPlay for use with a specific vehicle: the manufacturer has to use the actual infotainment system to develop applications for CarPlay and to test CarPlay. For example, engineers need to build the software using the infotainment hardware, and then flash the images to the target hardware to test. Performing these processes through the vehicle's infotainment system is complex and time consuming.

SUMMARY

To improve the productivity and for developing and testing applications like CarPlay prior to providing it for mainstream use in a vehicle as intended, the principles of this disclosure are introduced to achieve virtualization of the application on an Android emulator running on a desktop or laptop computer, or plurality thereof.

Various aspects of "Made for iPhone" ("MFi") Application Virtualization in an emulator, such as an Android emulator, using an authenticator coprocessor are provided herein. MFi is a protocol from Apple that allows manufacturers to access licensed technology and create specifications and peripherals that work with the Apple technology. In one aspect of the present disclosure, a method for MFi virtualization in an Android emulator on a main CPU of a computer is described. A universal serial bus (USB) dongle is provided that includes an authentication coprocessor coupled via an inter-integrated circuit (I2C) interface to a USB-to-I2C converter. The authentication coprocessor enables a non-MFi protocol to interface with an MFi protocol. The computer receives data from the USB-to-I2C converter via a USB interface. The data is forwarded using a USB device passthrough to a virtual USB-to-I2C driver running in an Android emulator, to thereby virtualize the authentication coprocessor on the computer. An MFi application may then be seamlessly executed in the Android emulator.

In various embodiments, the MFi application includes Apple CarPlay. The MFi application may execute in an upper layer of the Android emulator accessible via one or more lower layers, including a layer corresponding to the virtual USB-to-I2C driver coupled to the virtualized authentication coprocessor. CarPlay may be executed on top of an Apple communication plugin and Interface Accessory Protocol ("IAP") stack in the Android emulator. An MFI protocol for communicating between an iPhone and an accessory is an IAP, now known as "iPhone Accessory Protocol." The IAP stack is a communication system that facilitates transmissions between an iPhone and an accessory using USB and other communication protocols. The CarPlay communication plugin and MFi IAP stack layer may be layered between the virtual USB-to-I2C driver and the CarPlay or other MFi applications of the Android emulator. The Android emulator may be used for developing and testing CarPlay directly on the Android emulator for subsequent optimization of CarPlay in an infotainment system of a target vehicle. A USB port to which the USB dongle or other external device is coupled is regulated by a USB driver, the USB driver assisting the USB device passthrough to pass the data as a virtual USB device to the USB-to-I2C driver running in the kernel of the Android emulator. While USB dongle is used in this example, in other embodiments, the authentication coprocessor and other elements can be part of another external device connected to the computer. The CarPlay application may receive a certificate from the virtualized authentication coprocessor. The application may send, in response to receiving the challenge results, challenge data to request the authentication coprocessor to calculate the challenge data received from iPhone. Then the application will send the challenge result back to the iPhone to complete the authentication process.

In another aspect of the disclosure, a computer apparatus for enabling CarPlay authentication in an Android emulator includes a memory storing a computer operating system (OS). The computer further includes a main CPU coupled to the memory and configured to execute the MFI application code. The apparatus includes a USB dongle configured to connect to a USB bus through a bus interface. The USB dongle includes an authentication coprocessor coupled to an inter-integrated circuit (I2C)-to-USB converter when the USB dongle is connected to a corresponding USB port. The apparatus further includes driver code stored in the memory and executable on the main CPU together with the OS for managing data exchanges between the authentication coprocessor and the main CPU. The main CPU executes code to generate an Android emulator running a CarPlay application as a virtual component. The Android emulator includes a USB-to-I2C driver configured to virtualize the authentication coprocessor as an I2C device running with the CarPlay application.

In various embodiments, the apparatus includes USB device passthrough code stored in the memory and configured when executed on the main CPU to enable the authentication coprocessor to be virtualized as an I2C device in the Android emulator. The USB device passthrough code is further configured to forward USB device data from the USB interface to a USB to I2C driver operating virtually within the Android emulator. The Android emulator further includes an CarPlay plugin and IAP stack to enable I2C device data converted by the USB to I2C driver to communicate via the CarPlay plugin and IAP stack with the CarPlay application. In various embodiments, a user may develop application software for the CarPlay application using the Android emulator to emulate an infotainment system of a target vehicle. The user may test application software for the CarPlay application using the Android emulator to emulate the infotainment system. The Android emulator may be configured to run on a Linux OS kernel stored in the memory and executed on the main CPU.

In still another aspect of the disclosure, a computer for running an MFi application in an emulator is described. The computer includes a memory, and at least one central processing unit (CPU) coupled to the memory and configured to execute code for providing a virtual emulator. The computer provides code stored in the memory and configured to manage data through a USB interface having a port into which a dongle having an authentication coprocessor is configured to be connected. The computer further includes a USB driver on the PC. The USB driver runs as executable code in an operating system of the PC. The USB driver is configured to provide a passthrough feature for the authentication coprocessor. The dongle includes an inter-integrated circuit (I2C) authentication coprocessor and is configured to connect with the MFi application using an USB-to-I2C converter on the dongle. The USB-to-I2C converter is coupled to the bus interface and the passthrough feature.

In various embodiments, the passthrough feature is configured to provide data from the authentication processor to a USB-to-I2C converter running in a kernel of the emulator. The USB-to-I2C converter may be virtually coupled to the MFi application in the emulator using an Apple communication plugin and IAP stack. The MFi application may be Apple CarPlay. In an embodiment, the emulator is run using a Linux kernel. In an embodiment, the emulator is an Android emulator.

The above summary is not intended to represent every embodiment or every aspect of the present disclosure. Rather, the foregoing summary merely provides examples of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes the various combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, explain the principles of the disclosure.

Figure 1:
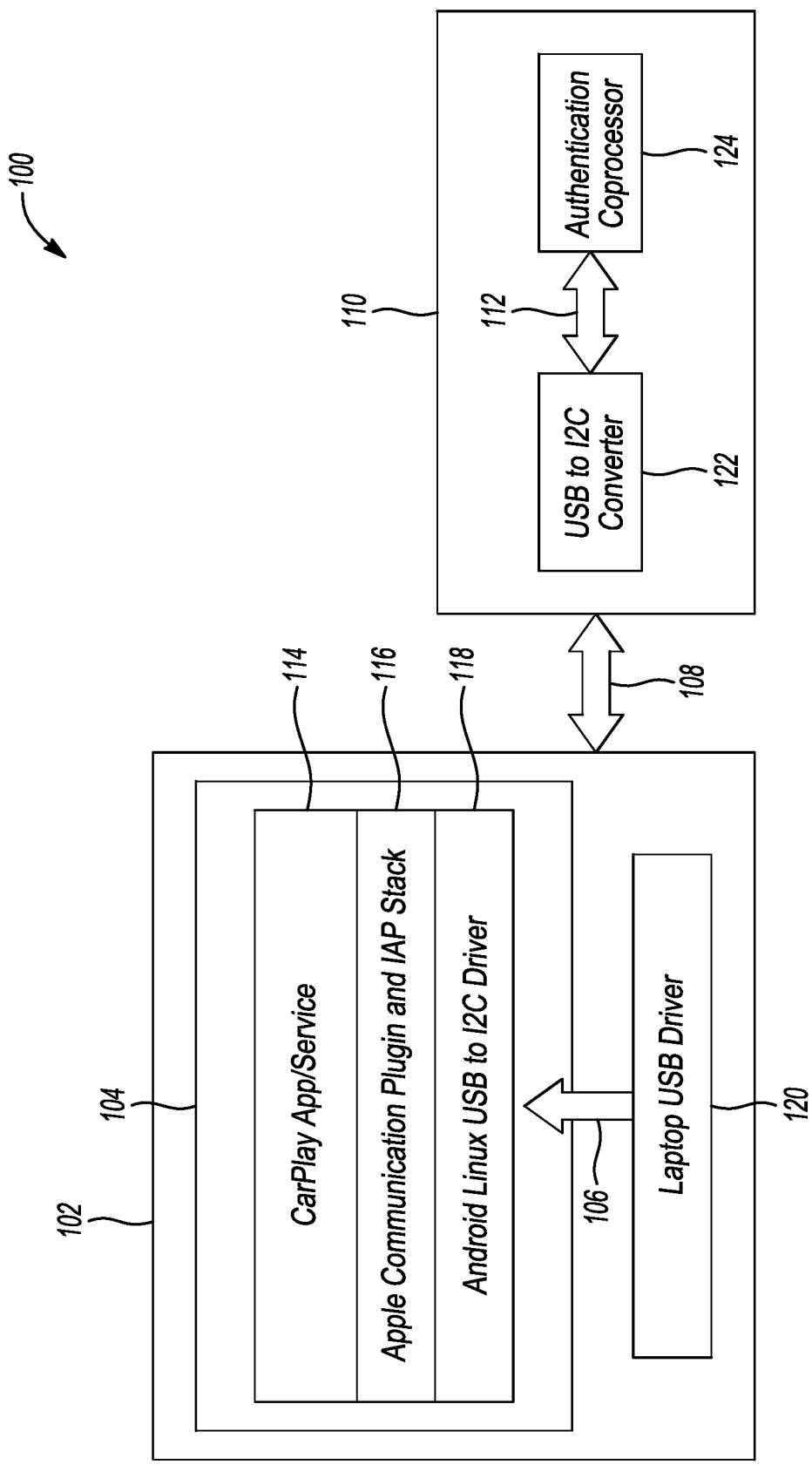
FIG. 1 is a conceptual diagram of an emulator running in a main CPU of a computer and appended via a USB interface to an authentication coprocessor virtualized for use with a MFi application such as CarPlay in the emulator, in accordance with an aspect of the disclosure.

The appended drawings are not necessarily drawn to scale and may present a simplified representation of various features of the present disclosure, including, for example, specific dimensions, orientations, locations, and shapes. In some cases, well-recognized features in certain drawings may be omitted to avoid unduly obscuring the concepts of the disclosure. Details associated with such features will be determined in part by the particular intended application and use case environment. While the appended drawings together with the disclosure provide an adequate description to any practitioner skilled in the art of the subject matter herein, for the benefit of those same practitioners, excessive detail well-known in the relevant art may in some cases be omitted to avoid unduly obscuring central concepts of different embodiments of the disclosure.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While the principles of the disclosure are described with respect to CarPlay, it will be appreciated that the disclosure is not so limiting and may well extend to any MFi application distributed and provided for use in a vehicle or other device, the latter whose unwieldy geometry and non-ideal use as a test or development platform render it preferential to use the principles herein prior to actual implementation of the corresponding solution in the vehicle or other device.

As noted, the principles of this disclosure provide effective virtualization for applications like CarPlay on an Android emulator executing on at least one main CPU corresponding with a desktop or laptop computer, or other computer(s). In the case of CarPlay, it was noted that the design of the Apple Authentication Coprocessor (herein, an example of an "authentication coprocessor") is distributed with CarPlay to connect to the main CPU in the above-described embedded system through an I2C bus. It was further noted that the main processor(s) or main CPU(s) of existing desktop or laptop computers cannot connect to Apple's authentication processor directly. As such, the CarPlay application cannot be supported for test and application development using a computer, as would otherwise be faster and more efficient. Examples of application development include developing applications that are consistent with CarPlay and that maximize the utility of CarPlay on the specific infotainment platform of the vehicle manufacturer, and other applications that enhance or bolster use of the infotainment platform in conjunction with CarPlay. Instead, the CarPlay software development may only be conducted, if at all, as implemented based on the embedded infotainment system.

Accordingly, in an aspect of the disclosure, authentications methods are provided which provide virtualization for MFi applications like CarPlay in an Android emulator using a main CPU on a computer. In various embodiments, these methods enable the I2C-based authentication coprocessor to connect to a computer virtually using a USB interface. The computer used for testing the application and for developing software to integrate CarPlay into a target vehicle may be a laptop computer, a desktop computer, a workstation, a server, or in some cases two or more of the foregoing. While this and other embodiments reference a "processor" or "main CPU," for clarity, the main processor or main CPU may also refer to a plurality of processors or CPUs for purposes of this disclosure. The one or more processors or CPUs may be run on one machine, or the one or more processors or CPUs may be run on one computer or a plurality of computers. In any case, the one or more main processors or CPUs are collectively just referred to as a "processor," a "CPU" or a "main CPU" for purposes of this disclosure.

Further, the principles of the disclosure include both hardware and software. Software may broadly include any kind of source code, object code, firmware, middleware, application programming interfaces, routines, programs, or similar concepts. Code may be used herein as a related term to describe the various types of software, such as object code being executed on a main CPU or authentication coprocessor, as appropriate in the context. The hardware in this disclosure includes at least a computer on which the main processor or main CPU is running, a USB dongle including an authentication coprocessor, and internal computer elements including memory, one or more buses, USB ports, interfaces, and the like. Because the disclosure includes both hardware and software, the application coprocessor (e.g., the Apple Application Coprocessor) may be virtualized as an I2C device on the computer side as described below with reference to the various drawings. This virtualization enables applications like CarPlay to run on an Android emulator on top of the computer (per the vernacular of a virtual machine). In turn, executing CarPlay or similar MFi application within the Android emulator along with the virtual authentication coprocessor on the computer side means that the development of CarPlay as used for a particular infotainment system may include increases in productivity and efficiency. That is to say, in this example, CarPlay need not run within the infotainment system as an embedded system during the testing and application development phase. Rather, the testing and software development may be optimized on a fast and efficient virtual system that lacks the unnecessary constraints introduced by the complex infotainment system.

FIG. 1 is a conceptual diagram of an Android emulator 104 running in a computer 102 and appended via a USB interface 108 to an authentication coprocessor 124 virtualized for use with a MFi application like CarPlay 114 in the Android emulator, in accordance with an aspect of the disclosure. An Android emulator, also referred to as an Android virtual machine, is software that emulates Android OS and its functionality on a computer. Android emulator 104 may be beneficial for vehicle infotainment systems that run an Android OS. Notably, Android emulator 104 may create a virtual representation of a phone or other device running in an Android environment. Android emulator 104 then runs the Android operating system as if it were running on a physical implementation of that device. FIG. 1 shows a computer 102, such as one or more of any of the computers discussed above, for use in developing and testing purposes. In this case, for example purposes, computer 102 may be a laptop computer. One such computer is shown for simplicity. Computer 102 is attached to a universal serial bus (USB) dongle 110 (a hardware component) via a USB interface 108 (which may include a hardware, software, and virtual component), which may lead to and extend within a port built in the computer 102 (See FIG. 3B). With continued reference to FIG. 1, laptop USB driver 120 is a software module executed using code in the processor or main CPU 350 of computer 102 (FIG. 3B). For purposes of FIG. 1, it is assumed that computer 102 includes the elements of a laptop computer, including a main CPU/processor, memory, and the various internal hardware and software interfaces (drivers, buses, combinational logic, northbridge and southbridge chips, nonvolatile memory, all under control of an operating system and various applications and protocols stored in, and retrievable from, dynamic random access memory.

The USB dongle 110, coupled to computer 102 via USB bus interface 108, may be controlled at least in part by the laptop USB driver 120 running within the operating system of the computer 102. In this embodiment, USB dongle 110 includes an authorization coprocessor 124, which for exemplary purposes may be an Apple Authorization Coprocessor as discussed herein. The authorization coprocessor 124 runs using an inter-integrated connection (I2C). An inter-integrated connection ("I2C") includes a corresponding I2C interface 112 (sometimes referred to as "I2C bus") that is used to exchange data between authorization coprocessor 124 and the external environment. Here, the USB dongle 110 also includes a USB-to-I2C converter, which enables USB-based data (e.g., authenticating data) to be recast as I2C data prior to being received at authorization processor 124. Similarly, as the I2C interface 112 may be bidirectional, converter 122 may recast output data from authentication coprocessor 124 as USB data. The USB data may then be provided via USB interface 108 to computer 102, or virtually, the Android emulator.

As noted, the USB dongle 110 is used in the above embodiment to provide the authentication coprocessor and corresponding hardware for use by the computer. In other embodiments, however, the USB dongle 110 may instead include another external device that can be coupled to a suitable interface of the computer to perform the same functions.

One benefit of the principles of the disclosure is the small size and number of components, and thus the relatively low cost, of the USB dongle 110 and computer 102 combination. In the embodiment of CarPlay, the authentication coprocessor 124 may be used to decrypt data during the testing and software development phase involving a target vehicle. The USB to I2C converter 122 and the I2C interface 112 may be designed as custom modules, or they may be provided as commercial-off-the-shelf (COTS) elements along with USB dongle 110. Accordingly, the principles of the disclosure do not need extensive amounts of additional hardware to accomplish their otherwise powerful objectives.

In various embodiments, the operating system of the computer 102 may virtually recognize a USB device (e.g., USB dongle 110 and data therefrom), which data the operating system may pass to the virtual machine of the Android emulator 104. In some embodiments, the operating system (OS) running in the virtual machine is distinct from the OS of the laptop. In one embodiment, the lower level (kernel) of the operating system of the Android emulator is Linux. The underlying OS of the computer 102 may be Windows, or another operating system. Thus, in various embodiments, the OS of the computer 102 may need to pass through the USB device (embodied within USB dongle 110 and the corresponding USB interface and USB data being exchanged, where applicable) that is running in the virtual machine of the Android emulator 104.

In various embodiments, the Linux kernel driver running in the virtual machine of the Android emulator 104 may assist with virtualizing and converting the USB device to an I2C device. To accomplish this, the Linux kernel may provide an Android Linux USB to I2C driver 118, which is running at the lowest stack in the Android emulator 104. In the continued example of CarPlay, an Apple Communication Plugin 116 may be provided as an intermediary layer of the Android emulator 104. Using the Apple Communication Plugin 116 and the Android Linux USB to I2C driver 118, the Apple CarPlay application 114 may access the remote authentication coprocessor 124 through the USB interface 108 with a virtualized method that is analogous to the way the local I2C interface 112 in USB dongle 110 access data on an SoC that will ultimately be used in the infotainment system of the target vehicle for which the subject software is being tested and optimized. Also, the CarPlay application 114 may access MFi-based data through the Apple Communication plugin 116 within the Android emulator 104.

Referring still to FIG. 1, the MFi application, such as the CarPlay application 114 running in the Android emulator 104, is running as part of a virtual machine. For example, CarPlay may read the authentication certificate stored on and passed from authentication coprocessor 124. The CarPlay application 114, using Android emulator 104, may thereupon write, to authentication coprocessor 124 using the USB bus 108 and other elements, the challenge data needed to request the authentication coprocessor 124 (here, the Apple authentication coprocessor) to calculate the challenge response data. CarPlay application 114 may then read, via the challenge response data provided by authentication coprocessor 124 to respond back to the MFi mobile device (in this example, an iPhone) to complete the authentication process.

Figure 2:
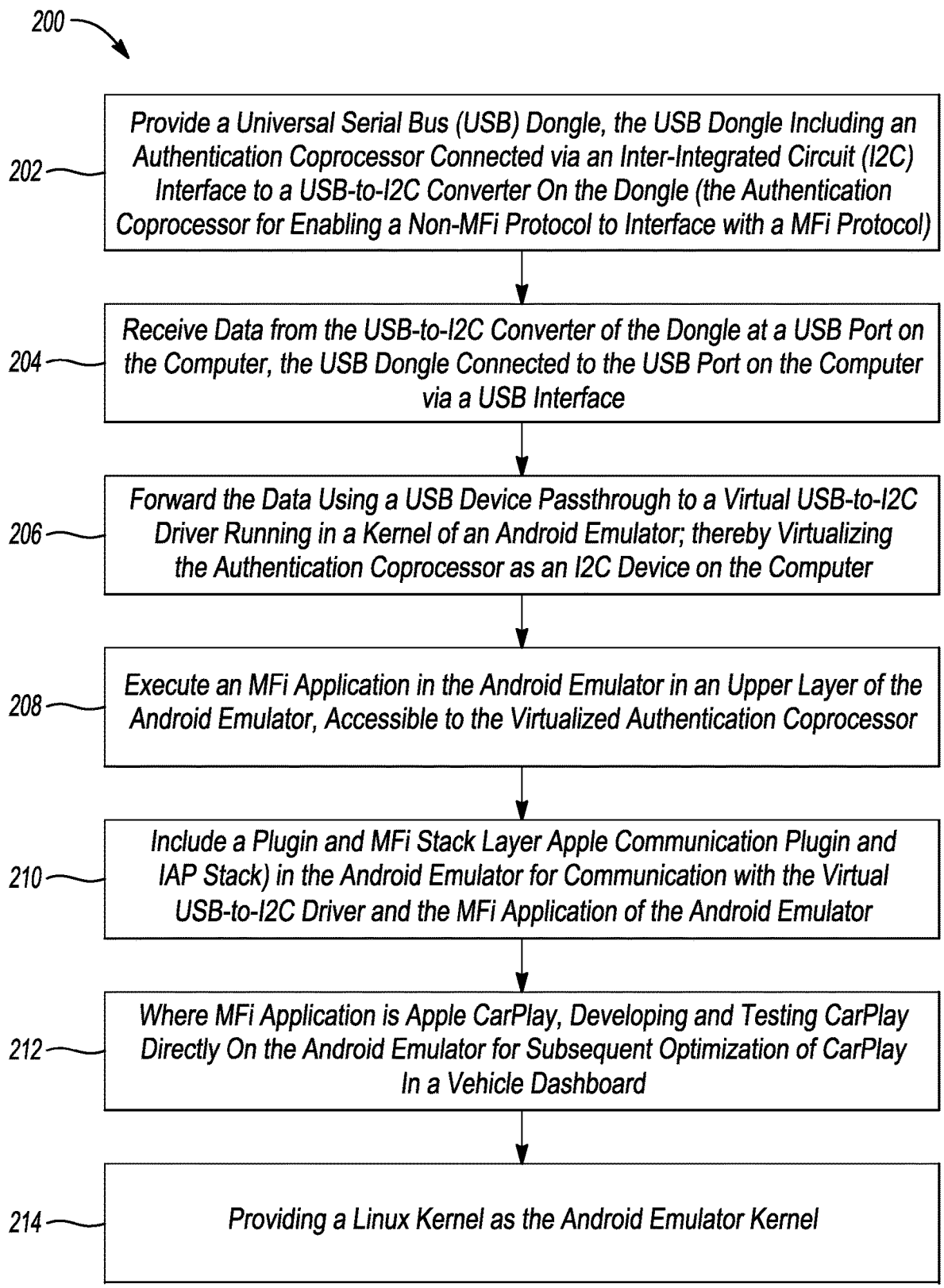
FIG. 2 is a flow diagram of a method for authenticating a MFi application in an emulator, in accordance with an aspect of the disclosure.

FIG. 2 is a flow diagram 200 of a method for authenticating a MFi application in an emulator, in accordance with an aspect of the disclosure. The steps of FIG. 2 may be performed by one or more computers as described herein, such as a laptop computer or desktop computer connected to a USB dongle. While various phenomena may be taking place at different layers of abstraction to accomplish the steps of FIG. 2, certain of these underlying phenomena may be omitted to clarify the steps undertaken to establish the Android emulator session. Referring initially to logic block 202, as noted, a USB dongle is provided. The USB dongle may include an authentication coprocessor connected via an I2C interface to a USB-to-I2C converter, that may be within the USB dongle. The authentication coprocessor may be configured in these examples for enabling a non-MFi protocol to interface with an MFi protocol. In the example of FIG. 1, the authentication coprocessor 124 may run as a virtual device within the Android emulator on the computer side, so that, for example, communications (including those to and from an iPhone or other mobile device) may be encrypted or decrypted, respectively.

Referring to logic block 204 of FIG. 2, the computer (including the Android emulator) may receive data from the USB-to-I2C converter of the USB dongle at a USB port on the computer. The USB dongle may be connected to the USB port on the computer via a USB interface. At logic block 206, the data, now converted to USB form, may be forwarded using a USB device passthrough to a virtual USB-to-I2C driver running in a kernel of the Android emulator (e.g., a Linux kernel), thereby virtualizing the authentication coprocessor as an I2C device on the side of the computer. This straightforward addition of the USB dongle has significant advantages in the flexibility and efficiency in developing software for Apple CarPlay or a similar MFi application that is specific to the infotainment architecture of the target vehicle.

Referring next to logic block 208, an MFi application such as CarPlay may be executed in the Android emulator in an upper layer. CarPlay is now accessible to the virtualized authentication coprocessor on the computer side. Encrypted communications may now be seamlessly decrypted using the virtualized authentication coprocessor.

At logic block 210, a plugin layer needed in an embodiment may be included to facilitate an Apple communication plugin and IAP stack in the Android emulator for communication with the virtual USB-to-I2C driver and the MFi application of the Android Emulator. Via the plugin, CarPlay may readily communicate with the lower layers including the Android Linux USB-to-I2C driver in the embodiment of FIG. 1.

Thereupon, referring to logic block 212 of FIG. 2, in an embodiment where the MFi application running in the Android emulator is CarPlay, engineers may test CarPlay, and develop software compatible with CarPlay and tailored to the infotainment system in the target vehicle, directly on the Android emulator for subsequent optimization of CarPlay in a vehicle dashboard, or other location where the main embedded SoC is intended to be placed. Logic block 214 refers to the embodiment where a Linux kernel is used as the Android emulator kernel, which may assist in receiving the authenticated data via the USB device passthrough mechanism as described in FIG. 1.

Beneficially, as the identity of the target vehicle changes, engineers may design different software algorithms that are made compatible with each specific target vehicle. This endeavor may be accomplished without requiring implementation of CarPlay with an authentication coprocessor on a system-on-a-chip (SoC). This latter step only needs to become realized after CarPlay is rigorously tested for the vehicle at issue and the software compatible with that infotainment system is fully developed.

Figure 3A:
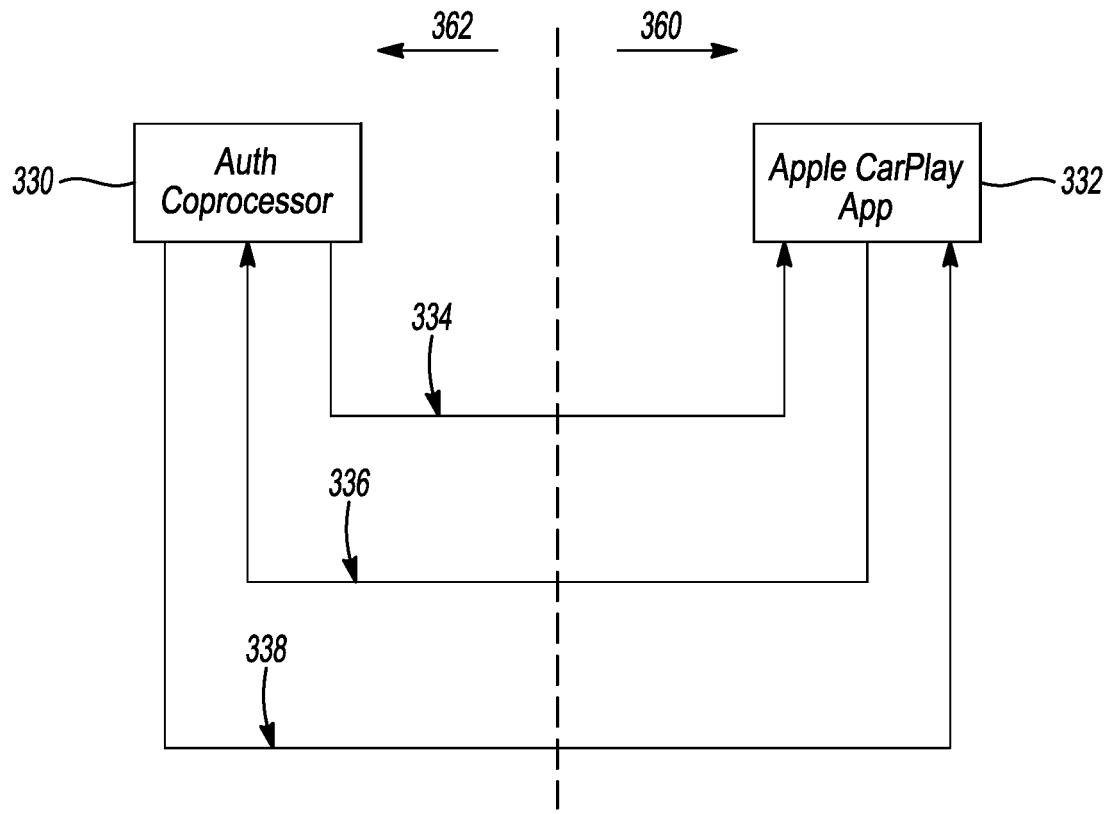
FIG. 3A is a conceptual diagram illustrating an interaction between a physical authentication coprocessor and a CarPlay application running in a main CPU on top of an Android emulator, in accordance with an aspect of the disclosure.
Figure 3B:
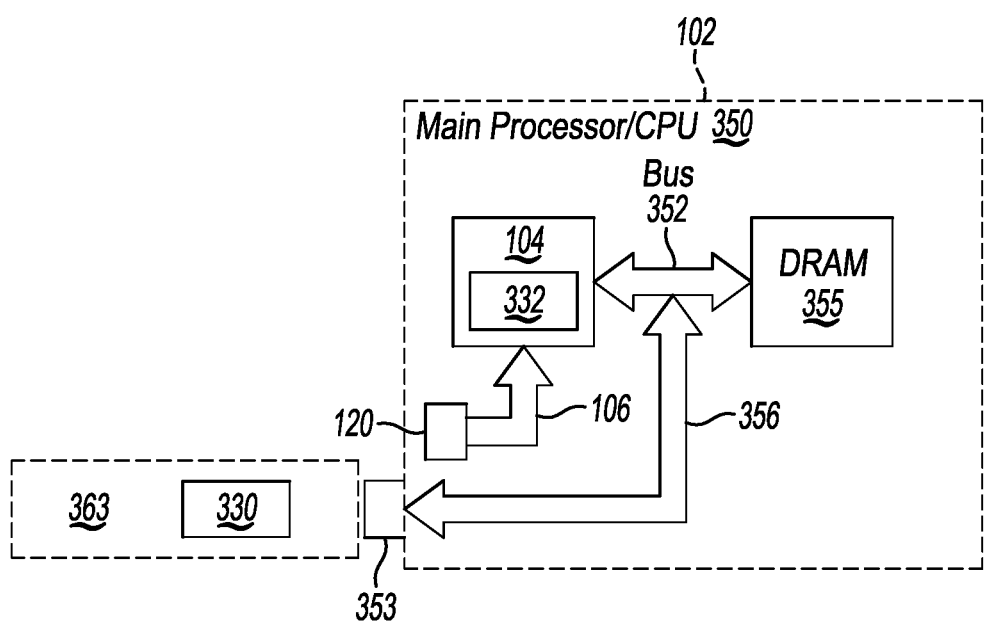
FIG. 3B is a conceptual diagram of a thread of execution showing an instance of the emulator and CarPlay application being run on a CPU, memory, and a USB bus in accordance with an aspect of the disclosure.

FIG. 3A is a conceptual diagram illustrating an interaction between a physical authentication coprocessor and a Car- Play application 332 running in a main CPU on top of an Android emulator, in accordance with an aspect of the disclosure. More specifically, in the example shown in FIG. 3A, three virtual paths 334, 336 and 338 are shown for performing three interactions between the CarPlay application 332 and the virtualized authentication coprocessor 330. The Android emulator is a collection of code representing a virtual device that imitates Android OS features on the computer. It may be used for debugging, testing, or running Android applications. In this instance, the Android emulator has been configured to virtualize an MFi-based application. The USB device passthrough described in this disclosure is a feature that allows a user to transfer data, charge devices, and connect peripherals through a USB connection. The USB passthrough allows a USB device in some cases to be directly connected to the system without using a USB hub. The passthrough therefore may in some examples eliminate the need for additional ports or cables. One result of this simplification is faster and more efficient communication. In some embodiments, a passthrough system can be adopted for simplifying various aspects of the virtual paths described in FIG. 3A.

As shown in FIG. 3A, the main CPU 360 side of the test configuration runs the emulator virtual machine, within which the CarPlay application 332 is executing. That is to say, an instance of a virtual machine is a digital representation that emulates real parts. The USB dongle 362 side of the test configuration physically houses the authentication coprocessor 330. As described in embodiments above, the collective main CPU 360 side resides in the computer side, and the USB dongle 362 side, while residing in the USB dongle device, may enable the virtual emulator to run the CarPlay application 332 on the main CPU side 360 from the perspective of CarPlay. It should be understood that the illustration of FIG. 3A shows three interactions for testing the CarPlay application 332 with an iPhone (virtually onboarded or discrete) by taking advantage of the data in authentication coprocessor 330, virtualized in the Android emulator. However, these three interactions are exemplary in nature. As the testing and development of the software progresses, additional and different interactions may take place, whether or not using the virtualized authentication coprocessor. Further, the types of virtual interactions that take place may change with the target vehicle and unique infotainment system, which in turn may be accounted for by adjusting code that runs the Android emulator.

With initial reference to FIG. 3A, a first virtual path 334 is included that enables data needed for authentication purposes for the CarPlay application 332 or the corresponding iPhone, such as an authentication certificate, to be provided to the CarPlay application 332 via the Android emulator. In FIG. 3A, the iPhone and authentication coprocessor may communicate by exchanging different messages. In one example, a connection may be established between the authentication coprocessor and an MFi application such as CarPlay. Virtual path 334 is described in FIG. 1. Referring briefly to FIG. 1, virtual path 334 entails an authorization certificate in the form of I2C data sourced from the authorization coprocessor 124 (or authentication coprocessor 330 in FIG. 3A) and sent via I2C interface 112 to USB-to-I2C converter 122. The bidirectional nature of converter 122 may be used to convert the I2C data to USB data, which in turn is sent via USB interface through a USB device passthrough 106 (which may be regulated by the computer operating system, the emulator kernel, and USB driver 120) to the Android emulator. The USB data is converted back to I2C-formatted data by driver 118, and the Apple communication plugin 116 may be used to provide the authentication certificate to CarPlay application 114. Referring back to FIG. 3A, virtual path 334 is completed when the CarPlay application 332 receives the authentication certificate.

Referring still to FIG. 3A, the CarPlay application 332 running in the Android emulator may read the provided certificate and may then respond by writing challenge data to request the authentication coprocessor 330 to decrypt the data over a next virtual path 336. Virtual path 336 may be implemented physically in an opposite manner as described with respect to virtual path 334. Other embodiments may involve dedicated physical channels for bi-directional communications. In this case, virtual path 334 carries the challenge data back to authentication coprocessor 330. Authentication coprocessor 330 may read the received challenge data and may then provide decrypted data in the form of challenge response data over a third virtual path 338 back to the CarPlay application 332 running on main-CPU side 360. The physical form of third virtual path 332 is identical to that of virtual path 338, except for the content of the data. The decrypted data, now at the CarPlay application 332 having been received from the authentication coprocessor 330 over virtual path 338, may be used to respond back to a corresponding iPhone to complete the authentication process.

Generally, each virtual communication in the Android emulator physically traverses an I2C interface, a USB-to-I2C converter (which may in some embodiments be bidirectional, and in other embodiments be dedicated in single directions each), and a USB interface. The USB device and corresponding data is virtualized using the computer's driver and the operating system in conjunction with the USB device passthrough. The resulting data traverses a USB-to-I2C driver as well as, in some embodiments, a suitable Apple communication plugin before finally reaching the virtual instance of CarPlay executing on the Android emulator.

As noted, an MFI protocol for communicating between an iPhone and an accessory is iAP, now known as "iPhone Accessory Protocol." The IAP stack is a communication system that facilitates transmissions between an iPhone and an accessory using USB and other communication protocols. An example of the IAP protocol being used to authenticate and communicate between an iPhone corresponding to a CarPlay or other MFi application and an authentication coprocessor is provided in FIG. 3B.

FIG. 3B is a conceptual diagram of physical devices producing a thread of execution during an instance of the emulator and CarPlay application being run on a processor (main CPU), memory, and a USB bus in accordance with an aspect of the disclosure. FIG. 3B includes main processor/CPU 350, which is the physical processor in the computer 102 in which the Android emulator 104 is run. As noted in prior embodiments, main processor/CPU 350 may in fact constitute a plurality of processors, each of which may include one or more central processing units (CPUs) and/or cores. Main processor/CPU 350 is configured to run the code that creates the virtual emulator 104. Because the virtual emulator 104 is shown at an instant in time in FIG. 3B, this figure may be construed to illustrate conceptually one or more threads of execution captured at a specific time. A thread is a sequence of execution. In some definitions, it is the smallest sequence that can be individually scheduled by a scheduler in the operating system. Here, however, the thread is just intended to refer to the main CPU and other components performing an action.

Further shown in FIG. 3B is dynamic random access memory (DRAM) 355, although other types of memory may be used. DRAM 355 is likely the memory in which the code used for execution on processor 350 is temporarily stored to execute tasks quickly and efficiently. It will be appreciated that, unlike in FIG. 3B, the main processor/CPU may be distinct from memory as in most mainstream computer architectures. For simplicity, main processor/CPU 350 is shown to include DRAM 355. However, main processor/CPU 350 may in other embodiments be mounted on a motherboard and may communicate with DRAM 355 using one or more bridge interface circuits. In some embodiments, the processor has cache memory that stores frequently used data for fast access. Bus 352 is also shown. In one aspect, bus 352 represents physical conductors that enable the main processor/CPU 350 to exchange data and code with the DRAM 355.

In another aspect, bus 352 may provide a virtual means of exchange of data within the computer 102. For example, in a virtual representation of FIG. 3, the CarPlay application 332 is running in Android emulator 104. In turn, Android emulator 104 is coupled to other components via bus 352 and virtual interface 356, which may be a USB interface. Omitted for clarity are the circuits that convert USB into another serial form of communication (and vice versa) on the motherboard. Further shown conceptually is USB driver 120, which is physically represented by code running in main processor/CPU 350 within the operating system of the computer 102. Shown adjacent driver 120 is USB device passthrough 106, for assisting in transmitting data from a USB port 353 and through the interface 356 to the Android emulator 332.

In alternative embodiments, the combination of bus 352 and USB interface 356 may be conceptually viewed as an exchange of data between authentication coprocessor 330 and the CarPlay application 332. Physically, authentication coprocessor 330 resides in USB dongle 363. Virtually, from the perspective of CarPlay, authentication coprocessor 330 resides as a component within Android emulator 104. Further, in practice, Android emulator 104 is executed digitally as a virtual machine using main processor/CPU 350 based on code stored in DRAM 355 (and in some cases, another computer-readable medium such as a flash drive, hard disk, etc.) and the authentication coprocessor 330. While physically on the dongle 363, the authentication coprocessor 330 is virtually on the side of the computer 102 running within the Android emulator.

It should also be noted that the operating system of the computer may be stored in a nonvolatile memory such as a magnetic disc drive or a solid-state drive. Relevant portions of the operating system, including the kernel, may thereupon be loaded into the DRAM 355 when the computer 102 is first powered on. Further, a Linux or other separate operating system or kernel of the operating system may be stored in DRAM 355. All of the operating systems may be executed by processor 332 to enable the activities of the computer and to implement the Android emulator using a Linux kernel, for example.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for running a Made-for-iPhone (MFi) protocol for communicating between an iPhone and an iPhone Accessory Protocol (IAP) that facilitates transmissions between the iPhone and an accessory, comprising:
    providing a universal serial bus (USB) dongle comprising an authentication coprocessor coupled via an inter-integrated circuit (I2C) interface to a USB-to-I2C converter, the authentication coprocessor being operable for enabling a non-MFi protocol to interface with an MFi protocol;
    receiving data from the USB-to-I2C converter at a computer via a USB interface;
    forwarding the data using a USB device passthrough to a virtual USB-to-I2C driver layer running in an Android emulator to thereby virtualize the authentication coprocessor on the computer; and
    executing an Apple communication plugin and an IAP stack concurrently with the MFi application in the Android emulator, including executing the MFi application in an upper layer of the Android emulator accessible via one or more lower layers, the one or more lower layers including a layer corresponding to the virtual USB-to-I2C driver layer.

2. The method of claim 1, further comprising executing the MFi application on top of the Apple communication plugin and the IAP stack layer in the Android emulator, and the Apple communication plugin and the IAP stack layer on top of the virtual USB-to-I2C driver layer.

3. The method of claim 1, wherein the MFi application comprises Apple CarPlay.

4. The method of claim 3, further comprising developing and testing the Apple CarPlay directly on the Android emulator for subsequent optimization of the Apple CarPlay in a system.

5. The method of claim 1, wherein a USB port to which the USB dongle is connected is regulated by a USB driver, the USB driver assisting the USB device passthrough to pass the data as a virtual USB device to the USB-to-I2C driver running in a kernel of the Android emulator.

6. The method of claim 1, further comprising:
    receiving a certificate at the MFi application from the virtualized authentication coprocessor; and
    sending, from the MFi application in response to receiving challenge response data, challenge data to request the authentication coprocessor to calculate the challenge response data and then send back the challenge response data to a corresponding iPhone to complete the authentication.

7. An apparatus for enabling CarPlay authentication in an Android emulator, comprising:
    a memory storing a computer operating system (OS);
    a main central processing unit (CPU) coupled to the memory and configured to execute the OS;
    a universal serial bus (USB) dongle configured to connect to a USB bus through a bus interface, the USB dongle including an authentication coprocessor coupled to an inter-integrated circuit (I2C)-to-USB converter when the USB dongle is connected to a corresponding USB port;
    driver code stored in the memory and executable on the main CPU together with the OS for managing data exchanges between the authentication coprocessor and the main CPU; and
    a USB device passthrough code stored in the memory and configured, when executed on the main CPU, to enable the authentication coprocessor to be virtualized as an I2C device in the Android emulator;

wherein the main CPU executes code to generate the Android emulator running a CarPlay application as a virtual component, the Android emulator including a USB-to-Inter-Integrated Circuit ("I2C") driver configured to virtualize the authentication coprocessor as an I2C device running with the CarPlay application.

8. The apparatus of claim 7, wherein the USB device passthrough code is further configured to forward USB device data from the USB interface to a USB-to-I2C driver operating virtually within the Android emulator.

9. The apparatus of claim 7, wherein the Android emulator further includes an Apple communication plugin and Interface Accessor Protocol (IAP) stack to enable I2C device data converted by the USB-to-I2C driver to communicate via the Apple communication and Made-for-iPhone (MFi) plugin with the CarPlay application.

10. The apparatus of claim 7, wherein a user is configured to develop application software for the CarPlay application using the Android emulator to emulate an infotainment system of a target vehicle.

11. The apparatus of claim 10, wherein the user is configured to test application software for the CarPlay application using the Android emulator to emulate the infotainment system.

12. The apparatus of claim 7, wherein the Android emulator is configured to run on a Linux OS kernel stored in the memory and executed on the main CPU.

13. A computer for running a Made-for-iPhone (MFi) application in an emulator, comprising:
 a memory;
 at least one main central processing unit (CPU) coupled to the memory and configured to execute code for providing a virtual emulator;
 code stored in the memory and configured to manage data through a universal serial bus (USB) interface having a port into which a dongle or other external device having an authentication coprocessor is configured to be connected; and
 a USB driver on the PC, the USB driver running in an operating system of the PC, the USB driver configured to provide a passthrough feature for the authentication coprocessor;
 wherein the dongle or other external device includes an inter-integrated circuit (I2C) authentication coprocessor and is configured to connect with the MFi application using an USB-to-I2C converter on the dongle or other external device, the USB-to-I2C converter being coupled to the bus interface and the passthrough feature, wherein the MFi application comprises Apple CarPlay.

14. The computer of claim 13, wherein the passthrough feature is configured to provide data from the authentication coprocessor to a USB-to-I2C converter running in a kernel of the emulator.

15. The computer of claim 14, wherein the USB-to-I2C converter is virtually coupled to the MFi CarPlay application in the emulator using an Apple communication plugin and Interface Accessory Protocol (IAP) stack.

16. The computer of claim 13, wherein the Android emulator is run using a Linux kernel.

17. The computer of claim 13, wherein the emulator comprises an Android emulator.

18. The method of claim 4, wherein developing and testing the Apple CarPlay directly on the Android emulator for subsequent optimization of the Apple CarPlay in a system includes developing and testing the Apple CarPlay directly on the Android emulator for subsequent optimization of the Apple CarPlay in an infotainment system of a target vehicle.

19. The apparatus of claim 7, wherein a USB port to which the USB dongle is connected is regulated by a USB driver.

20. The apparatus of claim 18, wherein the USB driver is operable for assisting the USB device passthrough to pass the data as a virtual USB device to the USB-to-I2C driver running in the kernel of the Android emulator.

* * * * *